US011763414B2

(12) United States Patent
Koo et al.

(10) Patent No.: US 11,763,414 B2
(45) Date of Patent: Sep. 19, 2023

(54) GLITCHLESS GPU SWITCHING AT A MULTIPLEXER

(71) Applicant: ATI TECHNOLOGIES ULC, Markham (CA)

(72) Inventors: Anthony W L Koo, Markham (CA); Syed Athar Hussain, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/029,750

(22) Filed: Sep. 23, 2020

(65) Prior Publication Data
US 2022/0092722 A1 Mar. 24, 2022

(51) Int. Cl.
*G06T 1/20* (2006.01)
*G09G 5/39* (2006.01)

(52) U.S. Cl.
CPC .................... *G06T 1/20* (2013.01); *G09G 5/39* (2013.01)

(58) Field of Classification Search
CPC ......... G06T 1/20; G06T 2210/52; G06T 1/60; G06F 3/1438; G09G 5/363; G09G 2360/02; G09G 2360/06; G09G 2360/08; G09G 2360/12; G09G 2360/127; G09G 5/39; G09G 5/393; G09G 5/395; G09G 2360/18
USPC .................................................. 345/502, 545
See application file for complete search history.

(56) References Cited

U.S. PATENT DOCUMENTS

| | | | |
|---|---|---|---|
| 7,698,579 B2* | 4/2010 | Hendry | G06F 1/3218 713/300 |
| 7,721,118 B1* | 5/2010 | Tamasi | G06F 1/3203 713/300 |
| 9,262,795 B2* | 2/2016 | Shu | G06T 1/60 |
| 10,412,320 B1* | 9/2019 | Kumar | H04N 5/268 |
| 2008/0030509 A1* | 2/2008 | Conroy | G09G 5/363 345/502 |
| 2008/0204460 A1* | 8/2008 | Marinkovic | G06F 3/14 345/502 |
| 2009/0079746 A1* | 3/2009 | Howard | H04N 21/4405 345/502 |
| 2009/0160865 A1* | 6/2009 | Grossman | H04N 19/44 345/502 |
| 2010/0091025 A1* | 4/2010 | Nugent | G09G 5/363 345/502 |
| 2010/0164962 A1* | 7/2010 | Sakariya | G06F 1/3293 345/502 |
| 2010/0164964 A1* | 7/2010 | Sakariya | G09G 5/39 345/505 |
| 2011/0164045 A1* | 7/2011 | Costa | G06F 15/76 345/502 |
| 2011/0164046 A1* | 7/2011 | Niederauer | G06F 1/3218 345/503 |
| 2011/0298814 A1 | 12/2011 | Mathew et al. | |

(Continued)

OTHER PUBLICATIONS

International Search Report and Written Opinion dated Dec. 8, 2021 for PCT/IB21/058616, 10 pages.

(Continued)

*Primary Examiner* — Jacinta M Crawford (57) ABSTRACT

A rendering device signals a display device to capture and replay a current frame to maintain a static image while switching between multiple graphics processing units (GPUs) at a multiplexer (MUX). Replaying the current frame while the MUX switch is in progress smooths the user experience such that no screen blanking or artifacts are observable.

22 Claims, 5 Drawing Sheets

(56) References Cited

U.S. PATENT DOCUMENTS

| | | | |
|---|---|---|---|
| 2012/0050259 A1* | 3/2012 | Solomonov | G06T 15/005 345/419 |
| 2012/0206461 A1* | 8/2012 | Wyatt | G06F 1/3218 345/501 |
| 2012/0262464 A1* | 10/2012 | Sakariya | G09G 5/363 345/502 |
| 2015/0130821 A1* | 5/2015 | Shah | G06F 3/14 345/520 |
| 2017/0090846 A1 | 3/2017 | Verma et al. | |
| 2017/0262955 A1* | 9/2017 | Lin | G09G 5/001 |
| 2019/0356897 A1* | 11/2019 | Karivaradaswamy | H04N 13/139 |
| 2019/0392781 A1* | 12/2019 | Hsu | G09G 5/363 |
| 2020/0043440 A1* | 2/2020 | Qiu | G06F 1/3296 |
| 2021/0097640 A1* | 4/2021 | Akiyama | G06T 1/20 |

OTHER PUBLICATIONS

International Preliminary Report on Patentability Issued in Application No. PCT/IB2021/058616, dated Apr. 6, 2023, 8 pages.

\* cited by examiner

GLITCHLESS GPU SWITCHING AT A MULTIPLEXER

BACKGROUND

A typical processing system employs a graphics processing unit (GPU) to generate images for display at a display panel. Based on information received from a central processing unit (CPU) or other processing unit, the GPU generates a series of frames and renders the series of frames for a display, such as a computer monitor. Some GPUs are capable of higher performance than others and can render higher intensity graphics in a short period of time. However, such high-performance GPUs consume more power than lower-performance GPUs, which are useful for conserving power during scenarios with lower intensity graphics. To leverage the graphics capabilities of a high-performance GPU and the power conservation of a lower-performance GPU, some processing systems employ multiple GPUs having different performance and power conservation characteristics.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In some multiple-GPU configurations, a lower-performance GPU is permanently connected to the display panel and content that has high graphics intensity is rendered by a high-performance GPU and is then copied or streamed to the lower-performance GPU to be output to the display panel. However, the overhead associated with copying or streaming the rendered content to the lower-performance GPU impacts performance and results in a lower frame rate which can negatively impact the user experience.

FIGS. 1-5 illustrate techniques for using a Panel Replay Protocol (PRP) for a display device while switching between multiple graphics processing units (GPUs) at a multiplexer (MUX). Switching between GPUs at a MUX saves the overhead associated with multiple-GPU configurations in which a lower-performance GPU is permanently connected to the display device and content rendered by a high-performance GPU is copied or streamed to the lower-performance GPU to be output to the display device. However, switching between GPUs at a MUX takes time during which the display device can blank or display artifacts that are observable by a user. Using a Panel Replay Protocol, in which the display panel captures and replays the most recently displayed frame to maintain a static image of the most recently displayed frame while the MUX switch is in progress, smooths the user experience such that no screen blanking or artifacts are observable and enables a low latency single-frame switch between GPUs. Further, during the time that the GPUs are switching, the active GPU uses advanced link power management (ALPM) to power down the link between the GPU and the display device, thus conserving power and improving efficiency.

Figure 1:
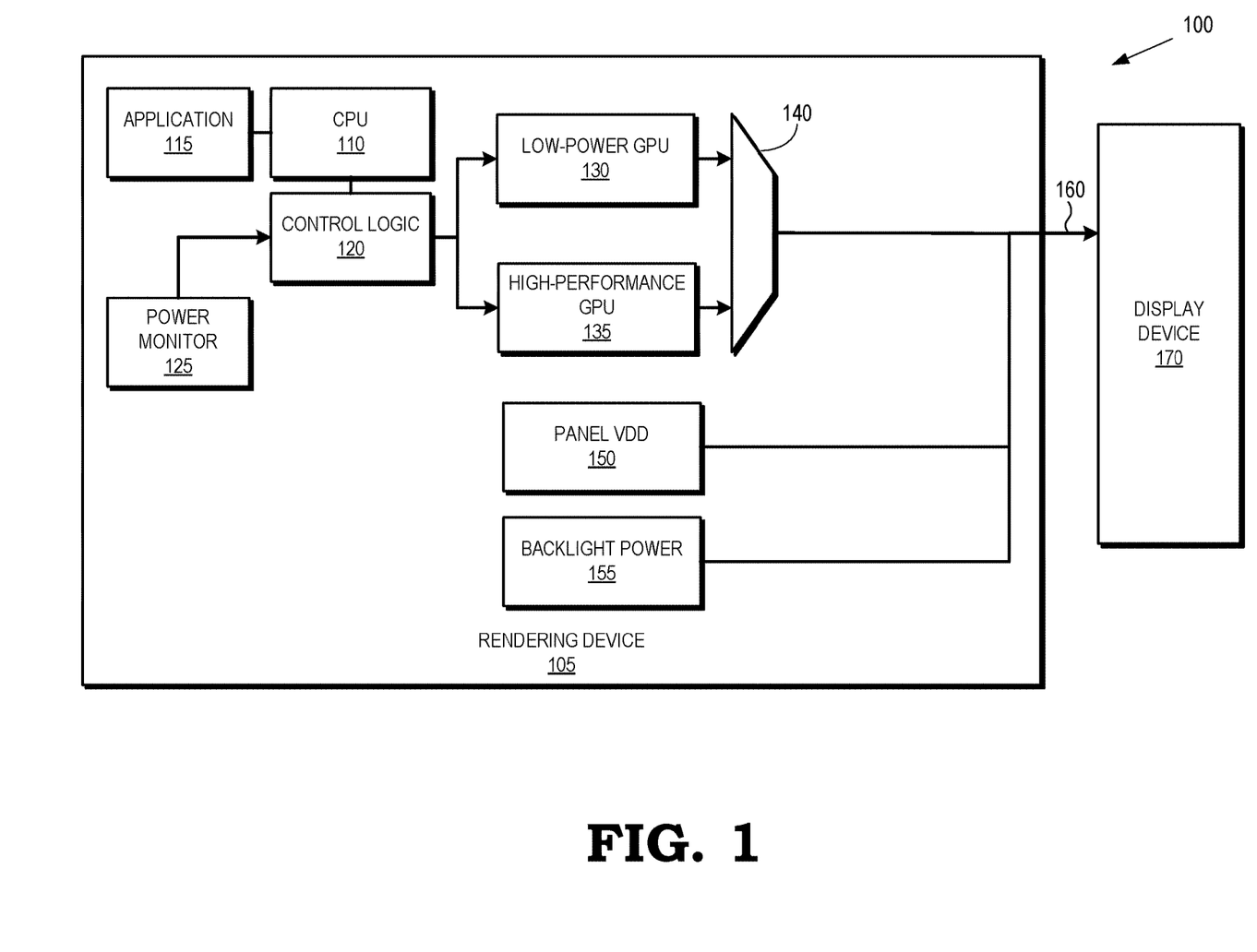
FIG. 1 is a block diagram of a processor employing a multiplexer to switch between multiple graphics processing units (GPUs) while a display panel is using a panel replay protocol in accordance with some embodiments.

FIG. 1 illustrates a processing system 100 including a rendering device 105 employing a MUX 140 to switch between a low-power GPU 130 and a high-performance GPU 135 while performing a panel replay protocol with a display device 170 in accordance with some embodiments. The processing system 100 is generally configured to execute sets of instructions (e.g., computer programs) such as application 115 to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, tablet, smartphone, and the like. In some embodiments, the rendering device 105 includes a panel VDD 150 and a backlight power 155. The panel VDD 150 is configured to power panel logic of the display device 170 and the backlight power 155 is configured to power a backlight of the display device 170.

To support execution of the sets of instructions, the rendering device 105 includes a plurality of processor cores such as central processing unit (CPU) 110. In some embodiments, each processor core includes one or more instruction pipelines to fetch instructions, decode the instructions into corresponding operations, dispatch the operations to one or more execution units, execute the operations, and retire the operations. In the course of executing instructions, the CPU 110 generates graphics operations and other operations associated with the visual display of information. Based on these operations, the CPU 110 provides commands and data to a plurality of graphics processing units (GPUs), illustrated in FIG. 1 as the low-power GPU 130 and the high-performance GPU 135. Although two GPUs are illustrated in FIG. 1, in some embodiments the rendering device 105 includes more than two GPUs.

The GPUs 130, 135 are generally configured to receive the commands and data associated with graphics and other display operations from the plurality of processor cores. Based on the received commands, the GPUs 130, 135 execute operations to generate frames for display. Examples of operations include vector operations, drawing operations, and the like. The low-power GPU 130 is implemented as an accelerated processing unit (APU) in some embodiments and is configured to conserve power while rendering frames having low graphics intensity. The high-performance GPU 135, on the other hand, is configured to render frames having high graphics intensity such as in video games and consumes more power than the low-power GPU 130. In some embodiments, the high-performance GPU 135 is capable of rendering frames at a higher frame rate than the low-power GPU 130. The low-power GPU 130 and the high-performance GPU 135 are connected to a multiplexer (MUX) 140, which switches between the low-power GPU 130 and the high-performance GPU 135 to output frames of video to the display device 170 such that only one of the low-power GPU 130 and the high-performance GPU 135 (referred to herein as the active GPU) outputs rendered frames at a time.

A control logic 120 is generally configured to determine which of the low-power GPU 130 and the high-performance GPU 135 is to render each frame based on inputs from the application 115 and commands received from the CPU 110, and inputs received from a power monitor 125. For example, if the control logic 120 determines based on inputs from the application 115 and commands received from the CPU 110 that a video game involving graphics intensive frames has launched, the control logic 120 determines that the high-performance GPU 135 should render the frames. If the low-power GPU 130 had been the active GPU prior to launch of the video game, the control logic 120 determines that a switch between the low-power GPU 130 and the high-performance GPU 135 is to occur at the MUX 140. The control logic 120 is further configured to signal the display device 170 when a switch between the GPUs 130, 135 is to occur.

Conversely, if the control logic 120 receives an indication from the power monitor 125 that battery power is below a threshold, the control logic 120 determines that the low-power GPU 130 should render frames in order to increase battery life. If the high-performance GPU 135 had been the initially active GPU prior to the indication of low battery power, the control logic 120 determines that a switch from the high-performance GPU 135 to the low-power GPU 130 is to occur at the MUX 140. The control logic 120 and the power monitor 125 are implemented as hard-coded or programmable logic, one or more processors executing software/firmware instructions, or any combination thereof.

Each rendered frame output from the active GPU is buffered in a frame buffer or other storage component (not shown) of the rendering device 105. The active GPU then operates to transmit the pixel data representative of the buffered frame on a row-by-row basis, along with associated metadata, to the display device 170 via an interconnect 160.

The display device 170 is a display device generally configured to visually display images at a panel based on the frames generated by the GPUs 130, 135. Accordingly, in different embodiments the display device 170 is a liquid crystal display (LCD) device, an organic light-emitting diode (OLED) device, and the like. As will be appreciated by one skilled in the art, the display device 170 is generally configured to periodically display the most recent frame generated by the active GPU by refreshing the display device 170 using the pixel data received from the active GPU. The display device 170 includes a frame buffer (not shown) and is capable of performing a Panel Replay Protocol (PRP).

To perform the Panel Replay Protocol, the display device 170 captures the current frame from the active GPU and stores the frame at the frame buffer. During the PRP, the active GPU interrupts providing frames to the display device 170 and the display device 170 self-refreshes by reading the captured frame from the display device 170 frame buffer at periodic intervals and providing the captured frame for display at the panel of the display device 170. The display device 170 switches back to live frame transmission from the active GPU in response to the active GPU sending a frame with a Live Frame indication using the PRP.

To facilitate glitchless switching between the low-power GPU 130 and the high-performance GPU 135 at the MUX 140 without blanking or artifacts, the control logic 120 signals the display device 170 to capture the current video frame at its frame buffer and replay the captured frame in response to the control logic 120 determining that a switch between the GPUs 130, 135 is to occur at the MUX 140. In response to receiving a Capture Frame signal to, the display device 170 begins to capture the current frame at the frame buffer. Once the capture is complete, the control logic 120 sends a Replay Frame signal to signal the display device 170 to maintain a static image by continually refreshing the panel using the captured frame. While the display device 170 refreshes the panel using the captured frame, the control logic 120 disables output from the active GPU, ceases transmitting data via the interconnect 160 to the display device 170, and initiates a switch from the active GPU 130, 135 to the other GPU 130, 135. For example, if the low-power GPU 130 was the initially active GPU that rendered the current frame, and the control logic 120 determines based on the graphics intensity of the next frame that a switch to the high-performance GPU 135 is desired, the control logic 120 disables output from the low-power GPU 130 once the display device 170 has begun self-refreshing with the captured frame and switches to the high-performance GPU 135 at the MUX 140.

After the switch at the MUX 140 is complete, the control logic 120 powers up the high-performance GPU 135. Once the high-performance GPU 135 output is enabled, the control logic 120 programs the high-performance GPU 135 to send a Live Frame signal to the display device 170 to display a new frame transmitted by the high-performance GPU 135. In response to receiving the Live Frame signal, the display device 170 re-syncs to the high-performance GPU 135 output.

In some embodiments, the GPUs 130, 135 employ a pseudo-timing synchronization mechanism such as reading a system time (not shown) to ensure that the switch from replaying the captured frame to displaying the live frame output from the newly active GPU 130, 135 occurs seamlessly. For example, while the output from the low-power GPU 130 is disabled during the switch, the display device 170 replays the captured frame using internal timing of the display device 170. When the high-performance GPU 135 sends the Live Frame signal, the high-performance GPU 135 uses the pseudo-timing synchronization mechanism to know when to start outputting the live frame. As a result, the high-performance GPU 135 outputs the live frame synchronously with the timing of the display device 170 output. As used herein, "synchronized" and "synchronously" refers to a relative alignment, within a specified amount of time (an error margin), of a specific point in display cycles of two or more devices.

For a scenario in which the high-performance GPU 135 was the initially active GPU and a switch to the low powered GPU 130 is desired, for example, because battery is running low, the control logic 120 disables the high-performance GPU 135 output while the display device 170 is self-refreshing with the captured frame and switches to the low-power GPU 130. Once the low-power GPU 130 output is enabled, the low-power GPU 130 transmits a new frame with a Live Frame indication to the display device 170 and the display device 170 re-syncs to the low-power GPU 130 output. Thus, for the period of time in which the low-power GPU 130 and the high-performance GPU 135 are switching at the MUX 140, the display device 170 maintains a static image of the captured frame that was last output by the initially active GPU, resulting in a glitchless and artifact-free user experience.

The panel VDD 150 continues to supply power to the panel logic of the display device 170 and the backlight power 155 continues to supply power to keep the backlight of the display device 170 lit during the switch between GPUs 130, 135 at the MUX 140. In some embodiments, the panel VDD 150 and the backlight power 155 are provided to the display device 170 independently of the MUX 140. In this way, the power supplied to the display device 170 from the panel VDD 150 and the backlight power 155 remain unaffected during the GPU switch at the MUX 140.

Figure 2:
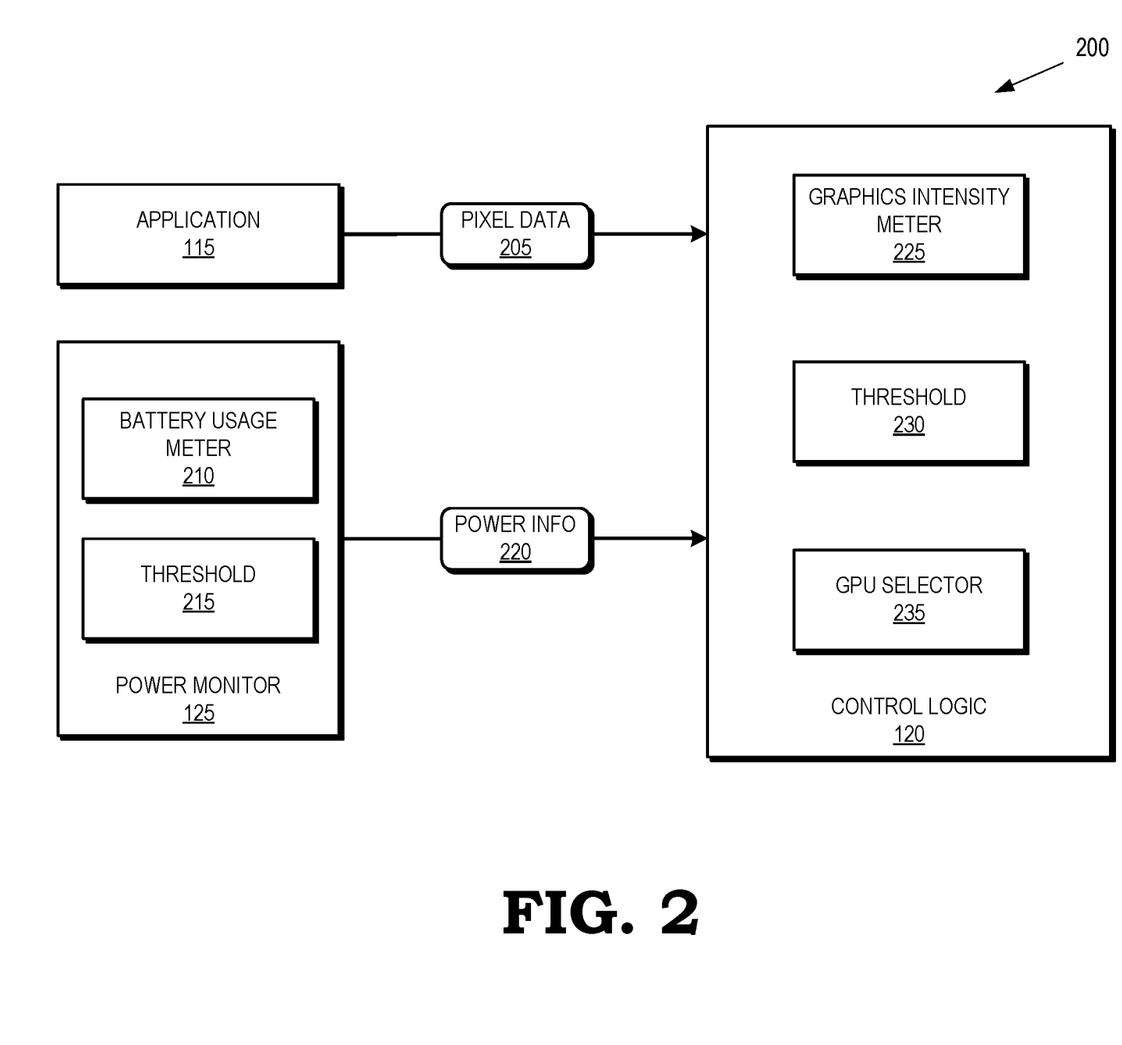
FIG. 2 is a block diagram of a control logic of the processor of FIG. 1 for determining which GPU to select to output a frame of pixel data to the display panel in accordance with some embodiments.

FIG. 2 is a block diagram of a portion 200 of the processing system 100 of FIG. 1 illustrating the control logic 120 of the rendering device 105 for determining which GPU to select to output a frame of pixel data to the display device 170 in accordance with some embodiments. The control logic 120 includes a graphics intensity meter 225 and a GPU selector 235. The control logic 120 receives frame data 205 based on the application 115 executing at the CPU 110 (not shown) and power information 220 from the power monitor 125. The power monitor 125 includes a battery usage meter 210.

The battery usage meter 210 monitors whether the processing system 100 is operating in a battery mode and the amount of battery power remaining. The power monitor 125 compares the amount of battery power remaining to a battery power threshold 215. The power monitor 125 provides the control logic 120 power information 220 indicating whether the amount of battery power remaining is below the battery power threshold 215. In some embodiments, the battery usage meter 210 additionally monitors a rate of battery power consumption and the power monitor 125 compares the rate of battery power consumption to a battery power consumption rate threshold and the power information 220 includes an indication of whether the rate of battery power consumption exceeds the battery power consumption rate threshold. The battery usage meter 210 is implemented as hard-coded or programmable logic, one or more processors executing software/firmware instructions, or any combination thereof.

Based on the pixel data 205, the graphics intensity meter 225 calculates the level of graphics intensity of each frame and compares it to a graphics intensity threshold 230. If the graphics intensity of a frame exceeds the graphics intensity threshold 230, the GPU selector 235 selects the high-performance GPU 235 to render the frame. In some embodiments, if the power information 220 indicates that the battery power remaining is below the battery power threshold 215, the GPU selector 235 overrides the selection of the high-performance GPU 135 (not shown) to render a frame whose graphics intensity exceeds the graphics intensity threshold 230 in order to increase battery life. If the graphics intensity of a frame is below the graphics intensity threshold 230, the GPU selector 235 selects the low-power GPU 130 (not shown) in order to conserve battery life. The graphics intensity meter 225 is implemented as hard-coded or programmable logic, one or more processors executing software/firmware instructions, or any combination thereof.

Figure 3:
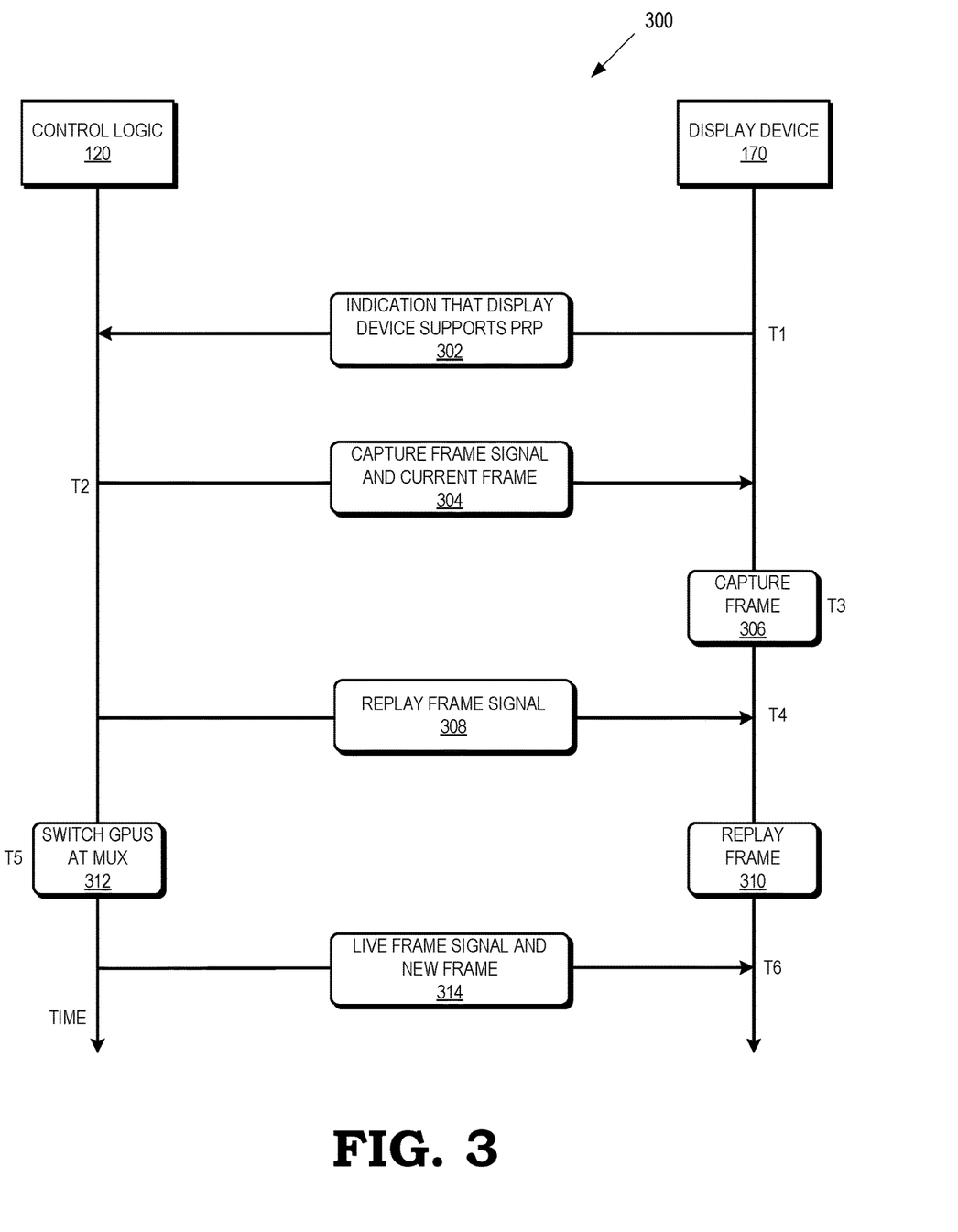
FIG. 3 illustrates a message flow between the GPU control logic, an active GPU, and the display panel for a panel replay protocol while the GPUs are switched at the multiplexer in accordance with some embodiments.

FIG. 3 illustrates a message flow 300 between the control logic 120, an active GPU 330 (i.e., whichever of the low-power GPU 130 or the high-performance GPU 135 is currently active), and the display device 170 for using a Panel Replay Protocol (PRP) to replay a captured frame while the GPUs 130, 135 are switched at the MUX 140 in accordance with some embodiments. At a time T1, the display device 170 provides an indication 302 to the control logic 120 that the display device 170 supports PRP. After T1, the control logic 120 determines that a GPU switch will occur at the MUX 140 for a frame and provides an indication (not shown) to the active GPU 330 that a GPU switch will occur at the MUX 140, either from the low-power GPU 130 to the high-performance GPU 135 or from the high-performance GPU 135 to the low-power GPU 130. In response to receiving the indication, at a time T2 the active GPU 330 sends a Capture Frame signal 304 with the current frame to the display device 170.

At a time T3, in response to receiving the signal 304 to capture the current frame, the display device 170 performs the action 306 of capturing the current frame at the frame buffer. After the display device 170 has captured the current frame at its frame buffer, at a time T4, the active GPU 330 sends a Replay Frame signal 308 to the display device 170, signaling the display device 170 to maintain a static image of the captured current frame. At a time T5, in response to receiving the Replay Frame signal 308, the display device 170 performs the action 310 of replaying the current frame at each refresh cycle of the display device 170 to maintain a static image while the control logic 120 performs the action 312 of switching the GPUs 130, 135 at the MUX 140. The action 312 of switching the GPUs 130, 135 at the MUX 140 includes disabling output from the initially active GPU 130, 135 (i.e., the GPU 130, 135 that rendered the captured frame), switching the GPUs 130, 135 at the MUX 140, powering up the initially inactive GPU 130, 135 (i.e., the GPU 130, 135 that did not render the captured frame), and enabling the initially inactive (now newly active) GPU 130, 135 to output to the display device 170. Once the newly active GPU 130, 135 is enabled to output, at a time T6 the active GPU 330 sends a Live Frame signal 314 and a new frame to the display device 170 to signal the display device 170 to power on to a ready state to accept input from the rendering device 105 via the interconnect 160. In response to receiving the Live Frame signal 314, the display device 170 powers on to a ready state to accept input from the rendering device 105 via the interconnect 160 and re-syncs to the newly active GPU 130, 135 output.

Figure 4:
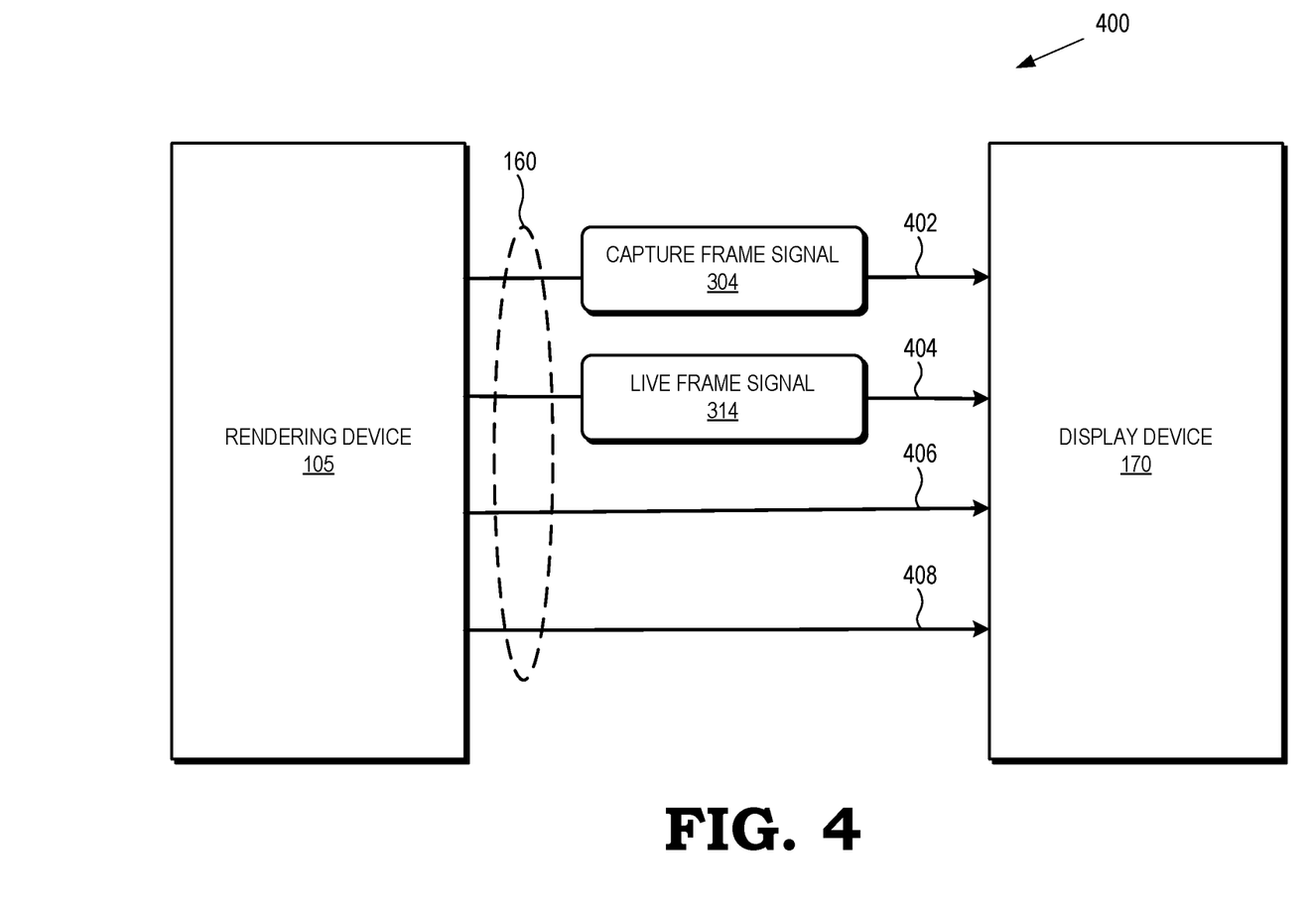
FIG. 4 is a block diagram of connections between the processor and the display panel for signaling the display panel for a panel replay protocol while the GPUs are switched at the multiplexer in accordance with some embodiments.

FIG. 4 is a block diagram of a portion 400 of the processing system 100 of FIG. 1 illustrating connections of the interconnect 160 between the rendering device 105 and the display device 170 for signaling the display device 170 to enter and exit the panel self-refresh mode while the GPUs 130, 135 are being switched at the multiplexer 140 in accordance with some embodiments. The interconnect 160 includes sets of pins 402, 404, 406, and 408. The set of pins 402 is the main link through which the active video signal is transmitted from the rendering device 105 to the display device 170. In some embodiments, the Capture Frame signal 304 to capture the current frame prior to a GPU switch at the MUX 140 is an info packet or metadata that is transmitted during a vertical blanking region of the current frame. In some embodiments, the active GPU 330 uses the Advanced Link Power Management (ALPM) feature of eDP to put to sleep or power down the set of pins 402 during the time the GPUs 130, 135 are switching at the MUX 140. Once the GPU switch is complete, the newly active GPU 130, 135 reads the panel state to determine that the display device 170 is in an ALPM sleep state. The newly active GPU 130, 135 wakes up the set of pins 402 and starts frame transmission to the display device 170.

The set of pins 404 is an auxiliary (AUX) channel that the rendering device 105 uses to wake up the display device 170 with the ALPM feature of eDP and transmit the Live Frame signal 314 to the display device 170 to display a new frame transmitted by the newly active GPU 130, 135 after a GPU switch at the MUX 140 has been completed. In some embodiments, the Live Frame signal 314 is an info packet or metadata that is transmitted during a vertical blanking region of the new frame. In some embodiments, during the time that the GPU switch at the MUX 140 is occurring, the sets of pins 402 and 404 are not used by the rendering device 105.

The set of pins 406 is used by the panel VDD 150 of the rendering device 105 to power the panel logic of the display device 170. Similarly, the set of pins 408 is the channel through which the backlight power 155 powers the backlight of the display device 170. The sets of pins 406 and 408 remain active during the time that the GPU switch at the MUX 140 is occurring such that the display device 170 remains powered on and the panel backlight of the display device 170 remains lit up during the GPU switch at the MUX 140.

Figure 5:
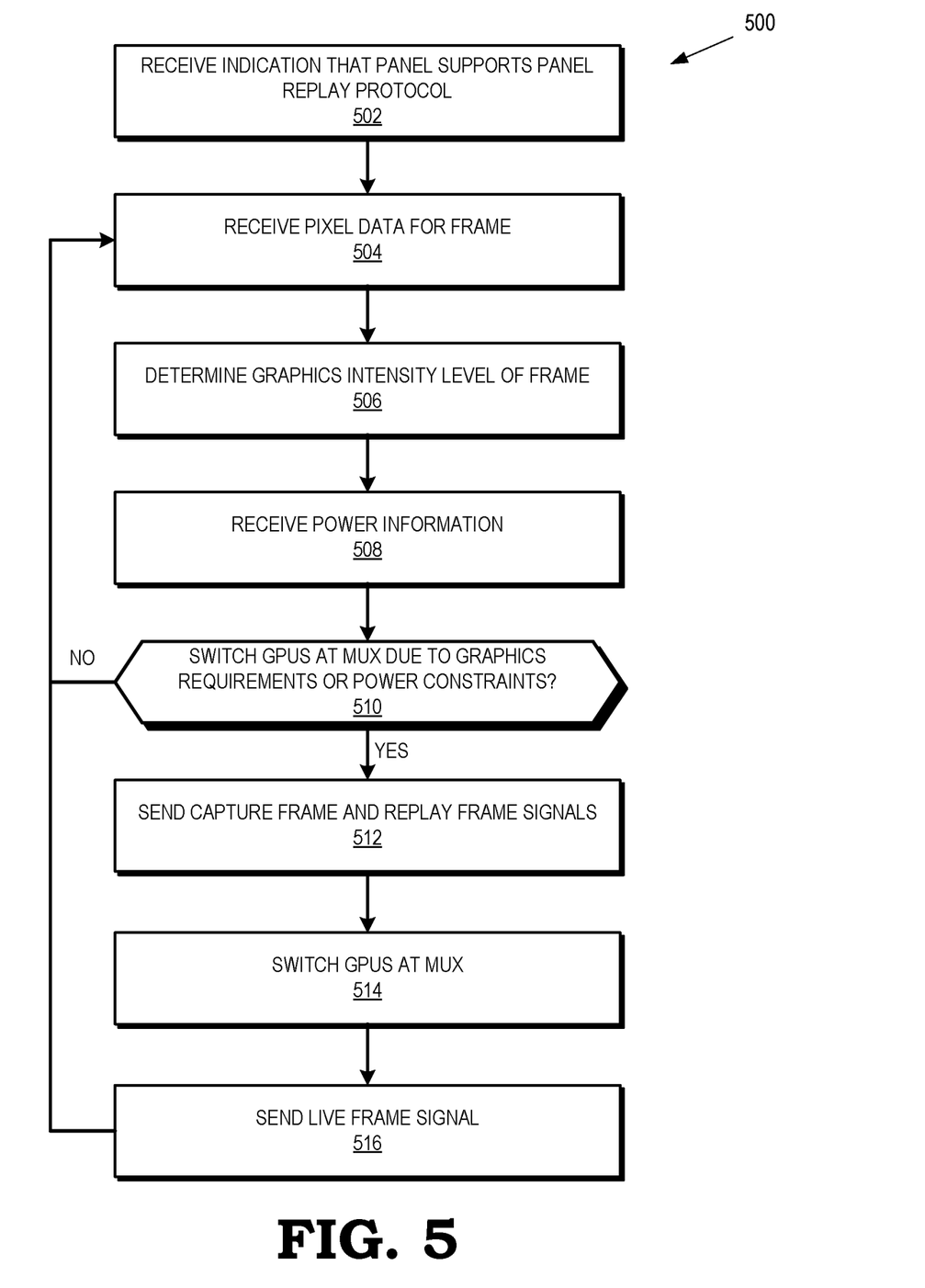
FIG. 5 is a flow diagram illustrating a method for using a panel replay protocol while GPUs outputting frames of pixel data to the display panel are switched at a multiplexer in accordance with some embodiments.

FIG. 5 is a flow diagram illustrating a method 500 for using a Panel Replay Protocol to signal a display device to self-refresh with a captured frame while GPUs outputting frames of pixel data to the display device are switched at a multiplexer in accordance with some embodiments. In some embodiments the method 500 is implemented by a processing system such as processing system 100 of FIG. 1.

At block 502, the control logic 120 receives an indication 302 from the display device 170 that the display device 170 supports Panel Replay Protocol. At block 504, the control logic 120 receives pixel data 205 for a current frame from the CPU 110 based on the application 115 currently executing. At block 506, the control logic 120 determines a graphics intensity level of the frame. At block 508, the control logic 120 receives power information 220 from the power monitor 125. Based on the graphics intensity level and the power information 220, the control logic 120 determines at block 510 whether to switch GPUs 130, 135 at the MUX 140 due to graphics requirements and/or power constraints. For example, if the low power GPU 130 is the active GPU that is rendering frames and outputting rendered frames through the MUX 140 and the control logic 120 determines that the graphics intensity level of the next frame exceeds a threshold and further that there is sufficient battery power, the control logic 120 determines to switch to the high-performance GPU 135 at the MUX 140. However, if the remaining battery power is below a threshold, in some embodiments, the control logic 120 determines to not switch to the high-performance GPU 135 and to maintain the low power GPU 130 as the active GPU. Conversely, if the high-performance GPU 135 is the active GPU and the control logic 120 determines that the graphics intensity level of the next frame does not exceed the threshold, or that there is insufficient battery power to maintain the high-performance GPU 135 as the active GPU, the control logic 120 determines to switch to the low power GPU 130 at the MUX 140.

If, at block 510, the control logic 120 determines to not switch GPUs 130, 135 at the MUX 140, the method flow continues back to block 504, at which the next frame of pixel data is received. If, at block 510, the control logic 120 determines to switch GPUs 130, 135 at the MUX 140, the method flow continues to block 512. At block 512, the active GPU 130, 135 sends a Capture Frame signal to the display device 170 to capture the current frame and a Replay Frame signal to replay the captured frame. In response to receiving the Capture Frame signal, the display device 170 captures the current frame at the frame buffer and refreshes the panel with the current frame. While the display device 170 is replaying the current frame, at block 514 the control logic 120 switches the GPUs 130, 135 at the MUX 140. Once the MUX 140 switch is complete, the control logic 120 powers up the newly active GPU 130, 135. When the newly active GPU 130, 135 is enabled to output a rendered frame, at block 516 the newly active GPU 130, 135 sends a Live Frame signal to the display device 170 to display a new frame transmitted by the newly active GPU 130, 135. Upon receiving the Live Frame signal, the display device 170 re-syncs to the newly active GPU 130, 135 output.

In some embodiments, the apparatus and techniques described above are implemented in a system including one or more integrated circuit (IC) devices (also referred to as integrated circuit packages or microchips), such as the processing system 100 described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to a comparison of a level of graphics intensity of a frame of pixel data to a graphics intensity threshold, signaling, at a rendering device of a processor, a capture and replay of pixel data output from a first graphics processing unit (GPU);
   switching from outputting pixel data from the first GPU to outputting pixel data from a second GPU in response to the capture and replay of pixel data output from the first GPU; and
   signaling, during a vertical blanking region of the frame of pixel data transmitted by the second GPU, a display of the frame of pixel data transmitted by the second GPU.

2. The method of claim 1, further comprising:
   disabling outputting pixel data from the first GPU in response to the replay of pixel data output by the first GPU.

3. The method of claim 1, wherein signaling the capture and replay of pixel data output by the first GPU comprises:
   signaling, during a vertical blanking region of a frame of pixel data output by the first GPU, the capture of pixel data output by the first GPU; and
   signaling a display of a static image from captured pixel data output by the first GPU.

4. The method of claim 1, further comprising:
   powering down a link between the rendering device and a display panel while switching from outputting pixel data from the first GPU to outputting pixel data from the second GPU.

5. The method of claim 1, further comprising:
   selecting, at a control logic of the processor, the first GPU or the second GPU to output the frame of pixel data based on at least one of the level of graphics intensity of the frame of pixel data and an amount of battery power of the processor,
   wherein signaling the capture and replay of pixel data output by the first GPU is further in response to selecting the second GPU to output the frame of pixel data.

6. The method of claim 5, wherein the comparison of the level of graphics intensity of the frame of pixel data to the graphics intensity threshold indicates the level of graphics intensity of the frame of pixel data exceeds the graphics intensity threshold and wherein the second GPU is a higher performance GPU than the first GPU.

7. The method of claim 5, wherein the comparison of the level of graphics intensity of the frame of pixel data to the graphics intensity threshold indicates the level of graphics intensity of the frame of pixel data is less than the graphics intensity threshold and wherein the second GPU is a lower performance GPU than the first GPU.

8. The method of claim 1, further comprising:
   synchronizing a transmission of the frame of pixel data between the second GPU and an internal timing of a display panel.

9. A method comprising:
   outputting pixel data from a first graphics processing unit (GPU) of a processor;
   in response to a comparison of a level of graphics intensity of a frame of pixel data to a graphics intensity threshold, signaling a replay of pixel data output from the first GPU;
   disabling outputting pixel data from the first GPU in response to the replaying of pixel data output from the first GPU;
   switching to output pixel data from a second GPU; and
   signaling, during a vertical blanking region of the frame of pixel data output from the second GPU, a display of the frame of pixel data output from the second GPU.

10. The method of claim 9, further comprising:
    determining that a display panel is enabled to maintain a static image while outputting pixel data from the first GPU is disabled.

11. The method of claim 9, wherein signaling the replay of pixel data output by the first GPU comprises:
    signaling, during a vertical blanking region of a frame of pixel data output by the first GPU, a capture of pixel data output from the first GPU at a frame buffer; and
    signaling a display of a static image of the captured pixel data in the frame buffer.

12. The method of claim 9, further comprising:
    powering down a link between the processor and a display panel while switching from outputting pixel data from the first GPU to outputting pixel data from the second GPU.

13. The method of claim 9, further comprising:
    selecting, at a control logic of the processor, the first GPU or the second GPU to output the frame of pixel data based on at least one of the level of graphics intensity of the frame of pixel data and a battery power of the processor.

14. The method of claim 13, wherein the comparison of the level of graphics intensity of the frame of pixel data to the graphics intensity threshold indicates the level of graphics intensity of the frame of pixel data exceeds the graphics intensity threshold and wherein the second GPU is a higher performance GPU than the first GPU.

15. The method of claim 14, wherein the comparison of the level of graphics intensity of the frame of pixel data to the graphics intensity threshold indicates the level of graphics intensity of the frame of pixel data is less than the graphics intensity threshold and wherein the second GPU is a lower performance GPU than the first GPU.

16. The method of claim 9, wherein the second GPU outputting pixel data is synchronized to a display panel output.

17. A device comprising:
- a first graphics processing unit (GPU);
- a second GPU; and
- a control logic configured to switch between outputting pixel data to a display panel from the first GPU and the second GPU; wherein
  - in response to a comparison of a level of graphics intensity of a frame of pixel data to a graphics intensity threshold, the first GPU is configured to signal the display panel to replay pixel data output from the first GPU in response to detecting that the device will switch from outputting pixel data to the display panel from the first GPU to outputting pixel data to the display panel from the second GPU; and
  - the second GPU is configured to signal, during a vertical blanking region of the frame of pixel data output from the second GPU, the display panel to display the frame of pixel data output from the second GPU.

18. The device of claim 17, wherein the first GPU is further configured to:

disable outputting pixel data in response to the display panel capturing and replaying pixel data output by the first GPU.

19. The device of claim 17, wherein, in response to receiving an indication that the control logic will switch from outputting pixel data to the display panel from the first GPU to outputting pixel data to the display panel from the second GPU, the first GPU is further configured to:
- signal, during a vertical blanking region of a frame of pixel data output by the first GPU, the display panel to capture pixel data output from the first GPU at a frame buffer; and
- signal the display panel to replay the captured pixel data in the frame buffer.

20. The device of claim 17, wherein, in response to the second GPU outputting pixel data, the second GPU is further configured to:
- signal the display panel to power on to a ready state to accept input from the device via an interconnect; and
- output pixel data to the display panel.

21. The device of claim 17, wherein the control logic is configured to select the first GPU or the second GPU to output pixel data for the frame of pixel data based on at least one of the level of graphics intensity of the frame of pixel data and a battery power of the device.

22. The device of claim 21, wherein the control logic is further configured to:
- select the second GPU to output the frame of pixel data in response to the comparison of the level of graphics intensity of the frame of pixel data to the graphics intensity threshold indicating the level of graphics intensity of the frame of pixel data as being higher than the graphics intensity threshold, wherein the second GPU is a higher performance GPU than the first GPU.

* * * * *